(12) United States Patent
Howes et al.

(10) Patent No.: US 9,610,884 B1
(45) Date of Patent: Apr. 4, 2017

(54) VEHICLE AND CARGO RATCHETING TIE DOWN APPARATUS AND SYSTEM

(71) Applicant: Cottrell, Inc., Gainesville, GA (US)

(72) Inventors: Phillip Bryan Howes, Braselton, GA (US); David Trenbeath, Buford, GA (US); Matthew Rahm, Buford, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

(21) Appl. No.: 14/992,094

(22) Filed: Jan. 11, 2016

(51) Int. Cl.
*B60P 7/08* (2006.01)

(52) U.S. Cl.
CPC ............ *B60P 7/083* (2013.01); *B60P 7/0853* (2013.01)

(58) Field of Classification Search
CPC .. B60P 7/08; B60P 7/0823; B60P 7/083; B60P 7/0853
USPC ......... 410/7, 9–12, 19, 21–23, 97, 100, 103; 254/217, 223, 243, 247, 245, 330, 241, 254/345, 346, 352, 355, 356, 357, 365, 254/369, 376; 248/499
See application file for complete search history.

(56) References Cited

U.S. PATENT DOCUMENTS

| | | | | |
|---|---|---|---|---|
| 4,009,770 A | * | 3/1977 | Schreyer | B66D 5/14 188/134 |
| 4,382,736 A | | 5/1983 | Thomas | |
| 4,813,304 A | * | 3/1989 | Kobayashi | E05F 11/505 242/378 |
| 5,088,694 A | * | 2/1992 | Nishimura | B66D 3/14 254/352 |
| 5,101,537 A | | 4/1992 | Cummings | |
| 5,238,226 A | * | 8/1993 | Nishimura | B66D 3/14 254/352 |
| 5,769,398 A | * | 6/1998 | Samejima | B66D 3/14 192/95 |
| 6,059,267 A | * | 5/2000 | Nishimura | B66D 3/14 192/95 |
| 6,352,243 B1 | * | 3/2002 | Samejima | B66D 3/16 254/346 |
| 7,585,140 B1 | | 9/2009 | Howes et al. | |
| 2002/0153519 A1 | * | 10/2002 | Samejima | B66D 3/14 254/352 |
| 2006/0013667 A1 | | 1/2006 | Ruan | |

* cited by examiner

*Primary Examiner* — Hilary Gutman

(57) ABSTRACT

A ratcheting tie down apparatus and system. Embodiments include a ratchet assembly affixed to a tie down shaft having a longitudinal axis, the ratchet assembly including a ratchet gear, a ratchet head, a ring pawl between the ratchet gear and the ratchet head, and a compression spring between the ring pawl and the ratchet head. A plurality of ramped protrusions of the ring pawl engage a plurality of ramped indentations in a back surface of the ratchet gear, such that when the ratchet head is rotated in a first direction, the ring pawl engages the ratchet gear so that the ratchet head and ratchet gear rotate as a single unit, and when the ratchet head is rotated in a second direction the ring pawl disengages from the ratchet gear such that the ratchet head and ratchet gear rotate independently.

20 Claims, 10 Drawing Sheets

VEHICLE AND CARGO RATCHETING TIE DOWN APPARATUS AND SYSTEM

DESCRIPTION OF THE RELATED ART

The present invention relates generally to cargo or automobile transport is an automobile and more particularly, to a ratcheting tie down apparatus and system. Cargo containers, other cargo loads, vehicles, etc. can be transported via a transport trailer ("trailer"). Multiple cargo loads, containers, or vehicles can be transported on such a trailer. For example when transporting vehicles, each vehicle transported typically has its own platform onto which each vehicle is placed. Each vehicle is secured to the trailer in some fashion, which may include a tie down system, securing each vehicle to its platform on the trailer. Typical tie down systems secure a vehicle with straps arranged around each wheel of the vehicle. The vehicle is typically restrained to the platform, and therefore the trailer, by arranging the straps to the wheels of the vehicle and the platform or other part of the trailer.

FIG. 1 illustrates a top perspective view of a prior art vehicle trailer tie down system 100. Locking mechanisms 120 are implemented to keep the straps 115 from loosening due to forces acting upon the vehicle 105 (e.g. gravity, centripetal and other forces asserted on the vehicle 105 from the trailer or otherwise). There are many types of mechanisms 120 such as ratchet or clamping devices that are manually tightened. For example, one end of the strap 115 can be connected to a fixed hook 125 that can be fixed to multiple slots 130 on the platform 110. The strap 115 can then be routed through an intermediate hook 135 also placed in one of the multiple slots 130 on the platform 110. The strap 115 can then be connected to a shaft 140 of the mechanism 120.

Current ratchet 145 and pawl 150 mechanisms are implemented to tighten the strap 115 around the shaft 140. The overall tie down system can include a gear casting with ramping surfaces engaged with a pawl 150. The ramping surfaces allow gear rotation in one direction, but stop rotation in the other direction due to engagement with the pawl 150. The shaft 140 is affixed to the gear casting. Currently, the shaft 140 can be equipped with either a chain attachment mechanism, or a strap attachment mechanism. Integral to the gear casting is a protrusion with a series of cross-holes that are perpendicular to the rotational axis of the gear casting.

In operation, a tie down bar 170 is inserted into these cross-holes and force is applied to the tie down bar 170, which creates a torque about the shaft 140. The torque is transmitted into tension in the chain or strap that is attached to the shaft 140. Typically, the tie down 170 bar can be rotated about 60 degrees at a time. If this rotation does not take up sufficient slack in the chain or strap, then the tie down bar 170 is pulled out of the current cross-hole 149, reinserted into the next convenient cross hole 149, and rotated again. Such ratchet 145 mechanisms only allow for adjusting the tension on the strap in large increments.

An improved ratcheting mechanism is disclosed in U.S. Pat. No. 7,585,140, which discloses a ratchet assembly with a ratchet head directly coupled to a ratchet gear with a plurality of resilient bodies interposed connecting the ratchet head and ratchet gear. One end of each of the resilient bodies fitting into a corresponding ramped pocket in the back surface of the ratchet gear, while the other end of each resilient body fits into a corresponding depression in the front surface of the ratchet head. However, this ratchet mechanism still only allows for adjusting the tension on the strap in relatively large increments. Additionally, this ratchet mechanism lacks easy serviceability.

Accordingly, what is needed is a further improved ratcheting mechanism that overcomes the shortcomings of the previous mechanisms and allows for easy and inexpensive manufacture and servicing, and that also allows for smaller and/or finer increments when tensioning the straps in a tie down system.

SUMMARY OF THE DISCLOSURE

Improved cargo and/or vehicle ratcheting tie down apparatuses and systems are disclosed. Exemplary embodiments include a ratcheting tie down system for a transport trailer for transporting any type of cargo. In an embodiment the transport trailer is a vehicle transporter having one or more vehicle platforms, the tie down system including a ratchet assembly affixed to an end of a tie down shaft having a longitudinal axis, the tie down shaft being affixed to the vehicle transporter and a ring pawl mechanism coupled to the ratchet assembly. An embodiment of the ratchet assembly includes a ratchet gear, a ratchet head, a ring pawl disposed between the ratchet gear and the ratchet head, and a compression spring disposed between the ring pawl and the ratchet head. A plurality of ramped protrusions of the ring pawl engage a plurality of ramped indentations in a back surface of the ratchet gear, such that when the ratchet head is rotated in a first direction, the compression spring is placed in an extended position and the ring pawl engages the ratchet gear so that the ratchet head and ratchet gear rotate as a single unit. When the ratchet head is rotated in a second direction the ring pawl disengages from the ratchet gear such that the ratchet head and ratchet gear rotate independently and the compression spring is placed in a second compressed position.

Other systems, apparatuses, and/or methods of using the same will be or become apparent to one with skill in the art upon review of the following drawings and detailed description. It is intended that all such additional systems, apparatuses, and/or methods of using the same be included within this description, be within the scope of the exemplary embodiments, and be protected by the accompanying claims.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

Exemplary embodiments include a ratcheting tie down apparatus and system that may be used with a transport trailer ("trailer") used to haul or transport cargo, such as cargo containers, vehicles, etc. The exemplary tie down apparatus allows an operator to insert the tie down bar once and tighten to the desired tension without continually reinserting the tie down bar. The conventional ratchet 145 is replaced by a ratcheting tie down apparatus 200 such as that illustrated in FIG. 2A or FIG. 2B.

Figure 1:
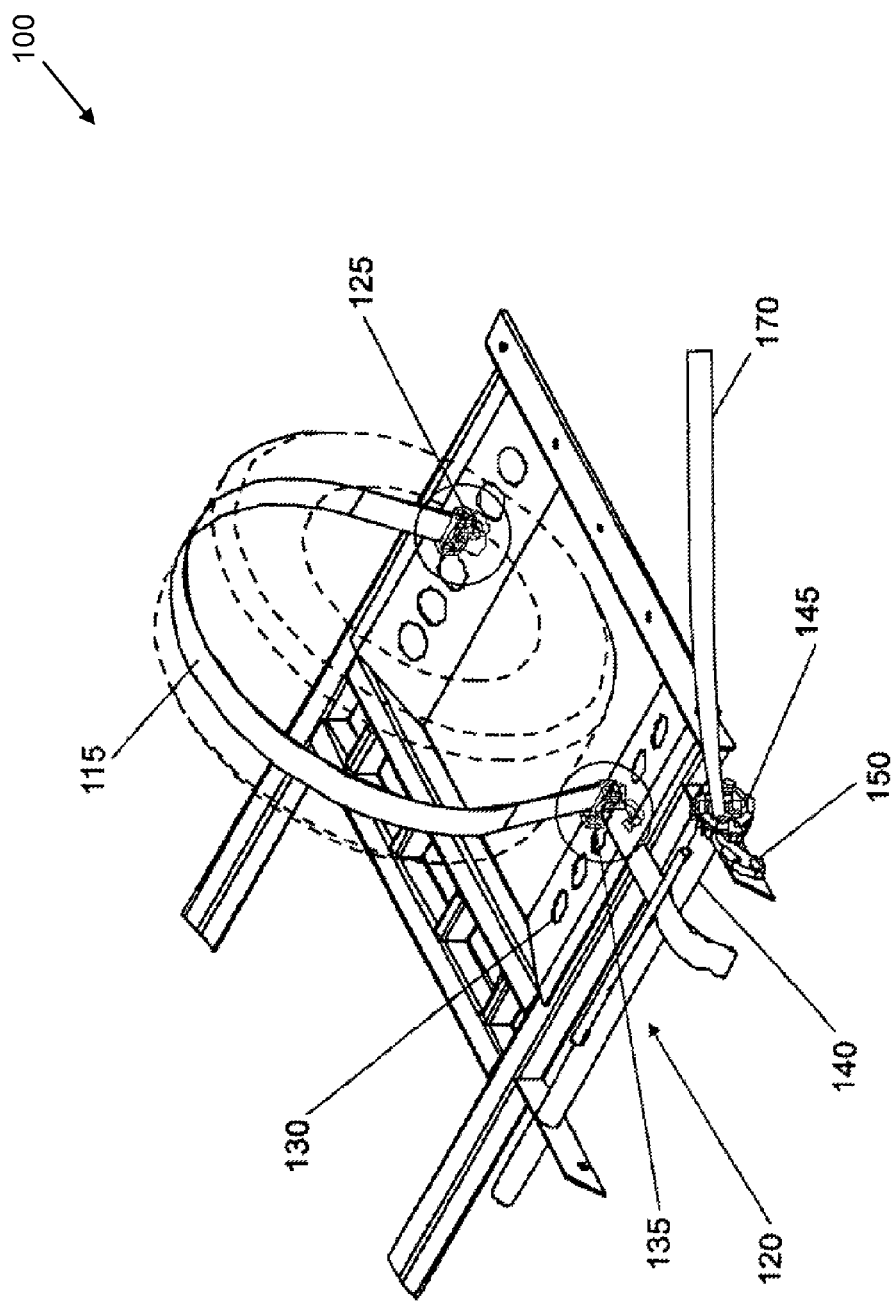
FIG. 1 illustrates a top perspective view of the prior art vehicle trailer tie down apparatus.
Figure 2A:
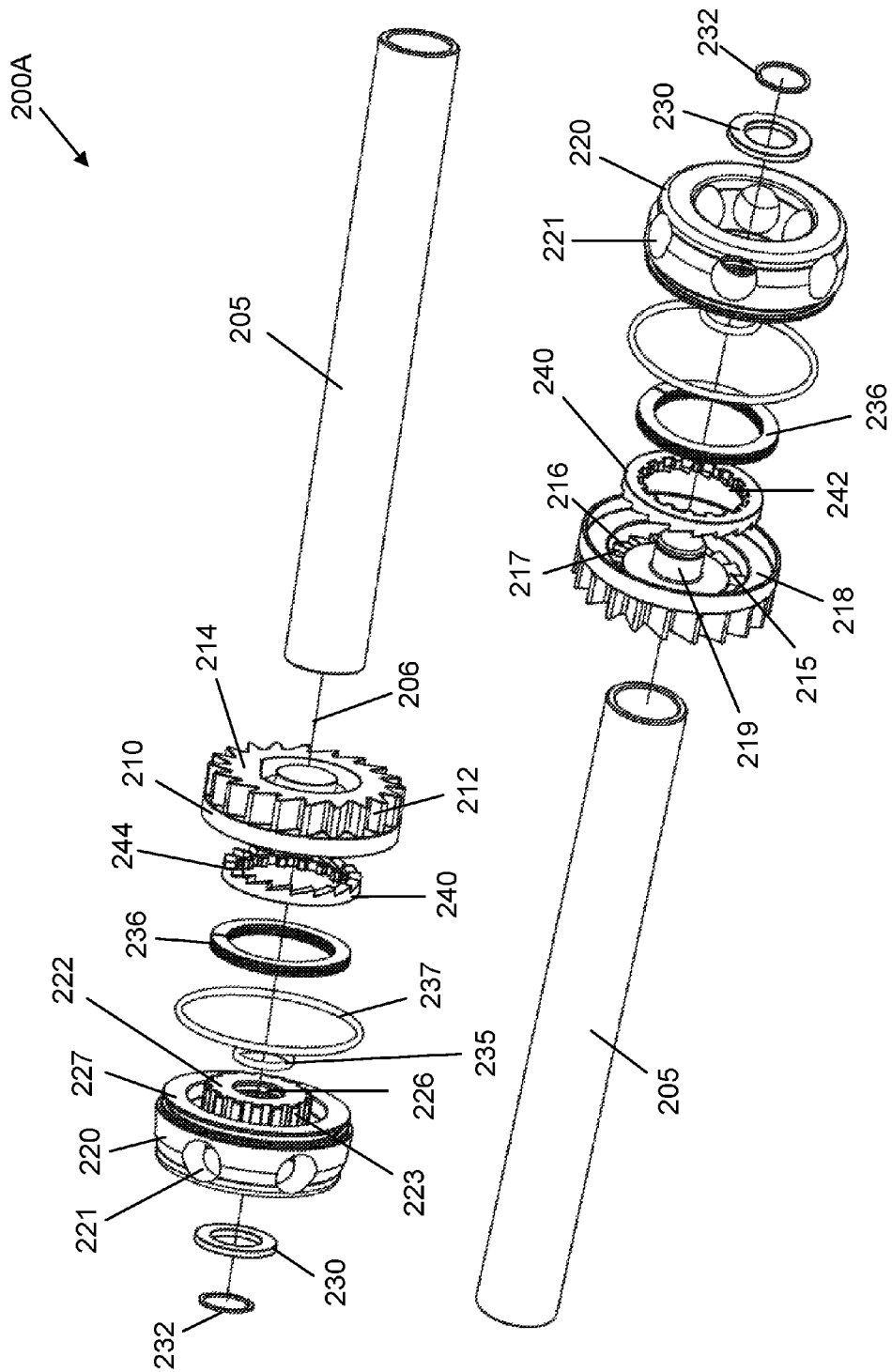
FIG. 2A illustrates an exploded perspective view of an embodiment of a ratcheting tie down apparatus.

FIG. 2A illustrates an exploded perspective view of an exemplary embodiment of a ratcheting tie down apparatus 200A. The apparatus 200A can be affixed to a trailer as part of a ratcheting system to secure cargo, cargo containers, vehicles, etc., to the trailer, such as by straps, including a ratcheting system similar to that illustrated in FIG. 1. In exemplary embodiment, the apparatus 200A includes a ratchet gear 210 which in the illustrated embodiment is generally circular in shape and is constructed of metal. In an implementation, the ratchet gear 210 may be milled, fabricated, or cast from a single piece of metal; while in other implementations, the ratchet gear 210 may comprise two separate pieces of metal, including different types of metal, joined together such as by epoxy of welding to form the ratchet gear 210. As illustrated in FIG. 2A, the ratchet gear 210 includes a set or plurality of engagement teeth 212 configured to engage with a pawl mechanism as described herein. As shown in FIG. 2A, the engagement teeth 212 may be arranged in a ring or circle on an outer periphery of a front surface 214 of the ratchet gear 210.

Figure 3:
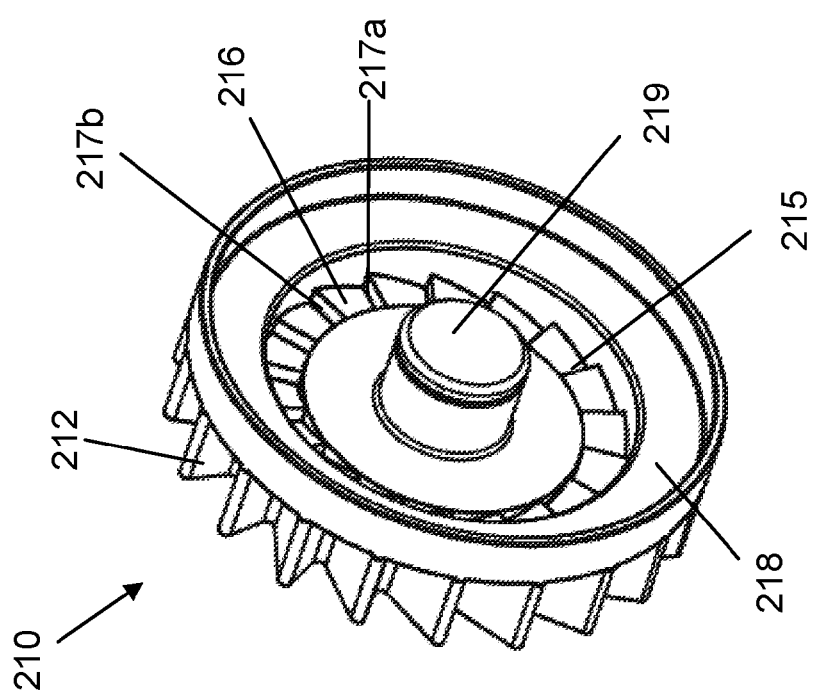
FIG. 3 illustrates a perspective view of an exemplary ratchet gear.

The ratchet gear 210 further includes a set or series of ramped indentations 215 in a back surface 218 of the ratchet gear 210 (see also FIG. 3). The ramped indentations 215 may be positioned in a ring or circle around a gear hub 219 of the ratchet gear 210 and the ramped indentations 215 may be milled, fabricated, or cast into the back surface 218 such that the uppermost portions of the ramped indentations 215 are below the plane formed by the back surface 218. As illustrated more clearly in FIG. 3, the ramped indentations 215 may each generally include a series of ramp surfaces 216 positioned between a series of vertical portions 217 such that the bottom-most portion of each ramp surface 216 begins at the bottom of a first vertical portion 217a and the upper-most portion of the ramp surface 216 ends at the top of a second, adjacent vertical portion 217b (see FIG. 3).

Returning to FIG. 2A, the front surface 214 of the ratchet gear 210 is configured to be attached or affixed to an axle shaft 205. The axle shaft 205 may be made or fabricated from metal, and may be shaft 140 for a system 100 illustrated in FIG. 1. For example, the axle shaft 205 can be any shaft implemented to tie down any load on or to the trailer, such as a cargo container, an automobile, etc. The axle shaft 205 may be further equipped with a chain attachment mechanism, a strap attachment mechanism, or any other appropriate attachment mechanism as described herein. The ratchet gear 210 is affixed to the axle shaft 205 such as by welding. When affixed to the axle shaft 205, the ratchet gear 210 rotates with the axle shaft 205 as a single unit about a longitudinal/rotational axis 206.

Figure 4:
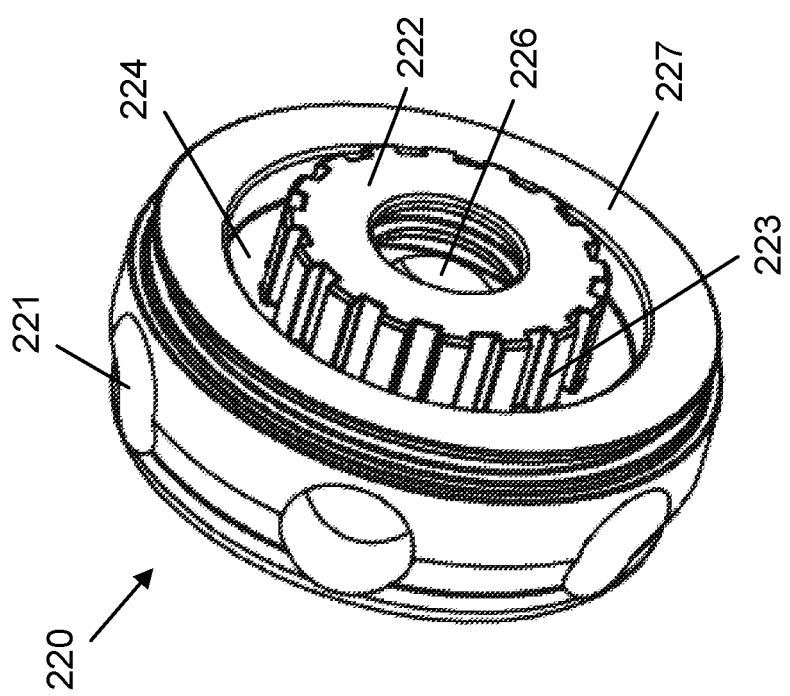
FIG. 4 illustrates a perspective view of an exemplary ratchet head.

As illustrated in FIG. 2A, the apparatus 200A further includes a ratchet head 220 having a series of cross-holes 221 that are perpendicular to the rotational axis 206 of the axle shaft 205 and generally positioned around a circumference of the ratchet head 220. The ratchet head 220 can further include a spline 222 extending from an inner face 224 (see FIG. 4) of the ratchet head 220 parallel to the rotational axis 206 of the axle shaft 205. As illustrated better in FIG. 4, the spline 222 may be arranged in a ring or circle extending from the inner face 224 of the ratchet head 220.

In an embodiment, the ratchet head 220 may be milled from a single piece of metal; while in other embodiments, the spline 222 may comprise a separate piece that is affixed or attached to form the ratchet head 220. The outside periphery of the spline 222 includes a plurality of spline teeth 223, that in an embodiment extend from the inner face 224 to the end of the spline 222 (see FIG. 4). The ratchet head 220 further includes an inner bore 226 extending through the center of the ratchet head 220, including through the center of the spline 222. In an embodiment, the inner bore 226 is circular and is sized so as to receive the gear hub 219 of the ratchet gear 210.

Returning to FIG. 2A, when assembled, the gear hub 219 of the ratchet gear 210 is received into and through the inner bore 226 of the ratchet head 220 and a washer 230 and snap ring 232 are fitted to the end of the gear hub 219 to hold the ratchet head 220 in place against the ratchet gear 210. An optional inner seal 235 may also be placed in the inner bore 226 in order to prevent dirt and other impediments from entering into and causing unnecessary wear on the apparatus 200 In the assembled apparatus 200, a front face 227 of the ratchet head 220 slidably engages the back surface 218 of the ratchet gear 210, with an optional outer seal 237 interposed between the two surfaces to further prevent dirt and other impediments from entering into and causing unnecessary wear on the apparatus 200.

As described above, the axle shaft 205 is affixed to the ratchet gear 210. Therefore, the axle shaft 205 and the ratchet gear 210 rotate as a single integral unit around the rotational axis 206. As described below, the ratchet head 220 is configured to rotate as a single unit with the ratchet gear 210 and the shaft 205 when rotating in a first/forward direction to provide tightening of a chain and/or strap. The ratchet head 220 is further configured to rotate independently with respect to the ratchet gear 210 and shaft 205 when the ratchet head 220 is rotated in a second/reverse direction during a ratcheting or "freewheeling" motion as further described herein.

These two different actions depending on the direction the ratchet head 220 is rotated are a result of a compression spring 236 and ring pawl 240 interposed between the ratchet head 220 and the ratchet gear 210. As illustrated in FIG. 2A, the compression spring 236 may be generally configured as a ring with an inner circumference large enough to receive the spline 222 of the ratchet head 220, and an outer circumference small enough to fit within an inner periphery of the front surface 227 of the ratchet head 220. In this manner the compression spring 236 may compress and decompress along the length of the spline 222 in a direction parallel to the longitudinal axis 206. The compression spring 236 may be made of any desired material and/or sized so as to provide the desired compression to allow the operations described below, and the exact amount of desired compression may vary in different implementations.

As shown in FIG. 2A, the ring pawl 240 is also generally configured as a ring with an inner circumference large enough to receive the spline 222 of the ratchet head 220, and an outer circumference small enough to fit within an inner periphery of the front surface 227 of the ratchet head 220. The inner circumference of the ring pawl 240 includes a set or plurality of pawl teeth 242 that correspond to the spline teeth 223 of the ratchet head 220 (see also FIGS. 5A-5C). The pawl teeth 242 on the inner circumference of the ring pawl 240 are configured to engage the spline teeth 223 of the ratchet head 220. When assembled, the ring pawl 240 may float or move along the spline 222 in a direction parallel to the longitudinal axis 206. At the same time, the pawl teeth 242 engage with the spline teeth 223 such that the ring pawl 240 rotates as a single unit with the ratchet head 220, regardless of which direction the ratchet head 220 is turned.

Figure 5C:
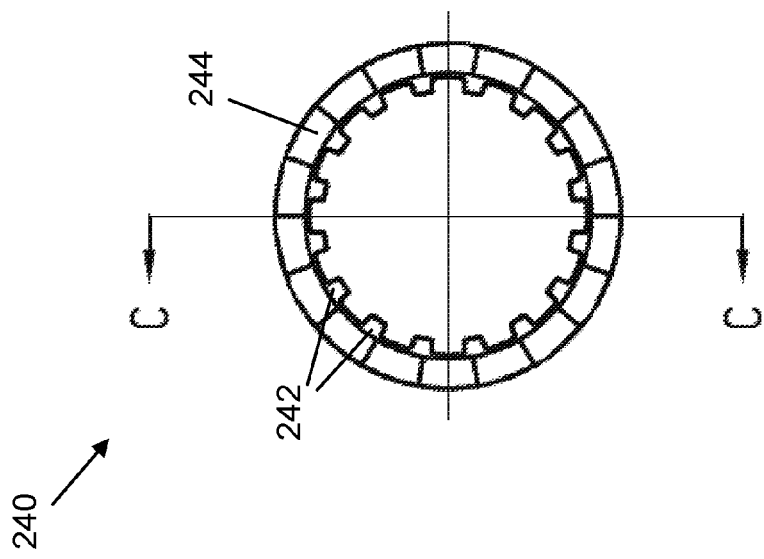
FIGS. 5A, 5B and 5C illustrate a perspective view, a cross-sectional side view, and a front view of an exemplary ring pawl.
Figure 5B:
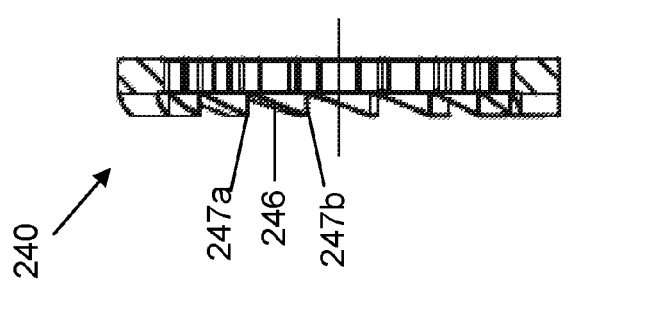
Figure 5A:
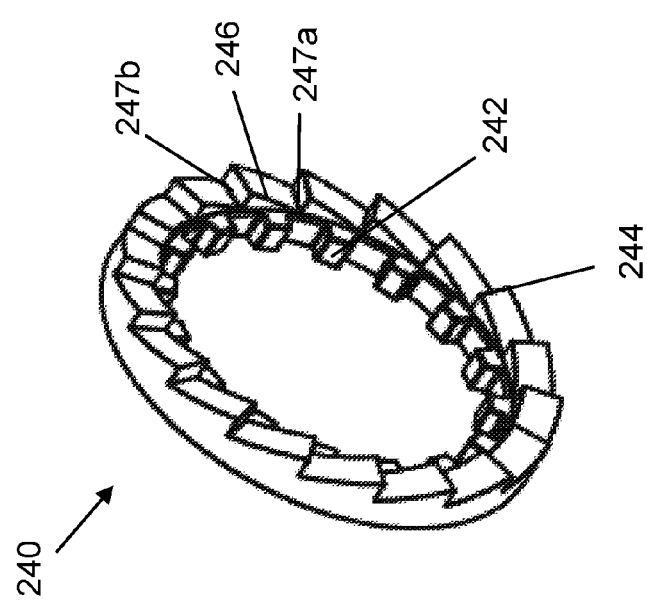

The back surface of the ring pawl 240 is substantially flat, while a set or series of ramped protrusions 244 extends from the front surface of the ring pawl 240 (see also FIGS. 5A-5C). The ramped protrusions 244 may be positioned in a ring or circle which extends away from the front surface of the ring pawl 240. As illustrated more clearly in FIGS. 5A-5C, the ramped protrusions 244 may each generally include a series of ramp surfaces 246 positioned between a series of vertical portions 247 such that the bottom-most portion of each ramp surface 246 begins at the bottom of a first vertical portion 247a and the upper-most portion of the ramp surface 246 ends at the top of a second, adjacent vertical portion 247b. In an embodiment, the ramped protrusions 244 of the ring pawl 240 are mirror images of, and sized to engage the ramped indentations 215 in the back surface 218 of the ratchet gear 210.

Returning to FIG. 2A, in exemplary embodiments, once the ratchet gear 210 and the ratchet head 220 are assembled together into the apparatus 200A, the back side of the compression spring 236 engages the inner face 224 of the ratchet head 220. The front side of the compression spring 236 engages the back side of the ring pawl 240. The compression in the compression spring 236 causes the ramped protrusions 244 of the ring pawl 240 to engage the ramped indentations 215 in the back surface 218 of the ratchet gear 210.

When the compression spring 236 is in a least compressed state, the ramped protrusions 244 of the ring pawl 240 are fully engaged with the ramped indentations 215 in the back surface 218 of the ratchet gear 210. In this state, a tie down bar as described herein may be inserted into the cross-holes 221 of the ratchet head 220. When a force is applied to the tie-down bar and a torque is applied to the axle shaft 205, there is no relative motion of the assembled ratchet gear 210 and ratchet head 220 because each of the vertical portions 247 of the ramped protrusions 244 of the ring pawl 240 press laterally against one of the respective vertical portions 217 of the ramped indentations 215 of the ratchet gear 210. The engagement of the ramped protrusions 244 of the ring pawl 240 with the ratchet gear 210 in this state, and the engagement of the pawl teeth 242 or the ring pawl 240 with the spline teeth of the ratchet head 220, cause ratchet gear 210 and the ratchet head 220 to move in this first/forward direction as a unit (i.e. without relative motion of the assembled ratchet gear 210 to the ratchet head 220).

Those skilled in the art appreciate that a respective pawl mechanism (see pawl mechanism 150 in FIG. 1) engages the engagement teeth 212 of the ratchet gear 210 during this first/forward direction of rotation. If the rotation does not take up sufficient slack in the chain or strap, then the tie down bar remains in the same cross-hole 221 and the operator simply rotates the opposite rotational direction to the direction implemented to apply the torque as described. This second/reverse rotational direction results in relative rotational movement, or "freewheeling" of the assembled ratchet gear 210 and ratchet head 220 as described below.

Figure 2B:
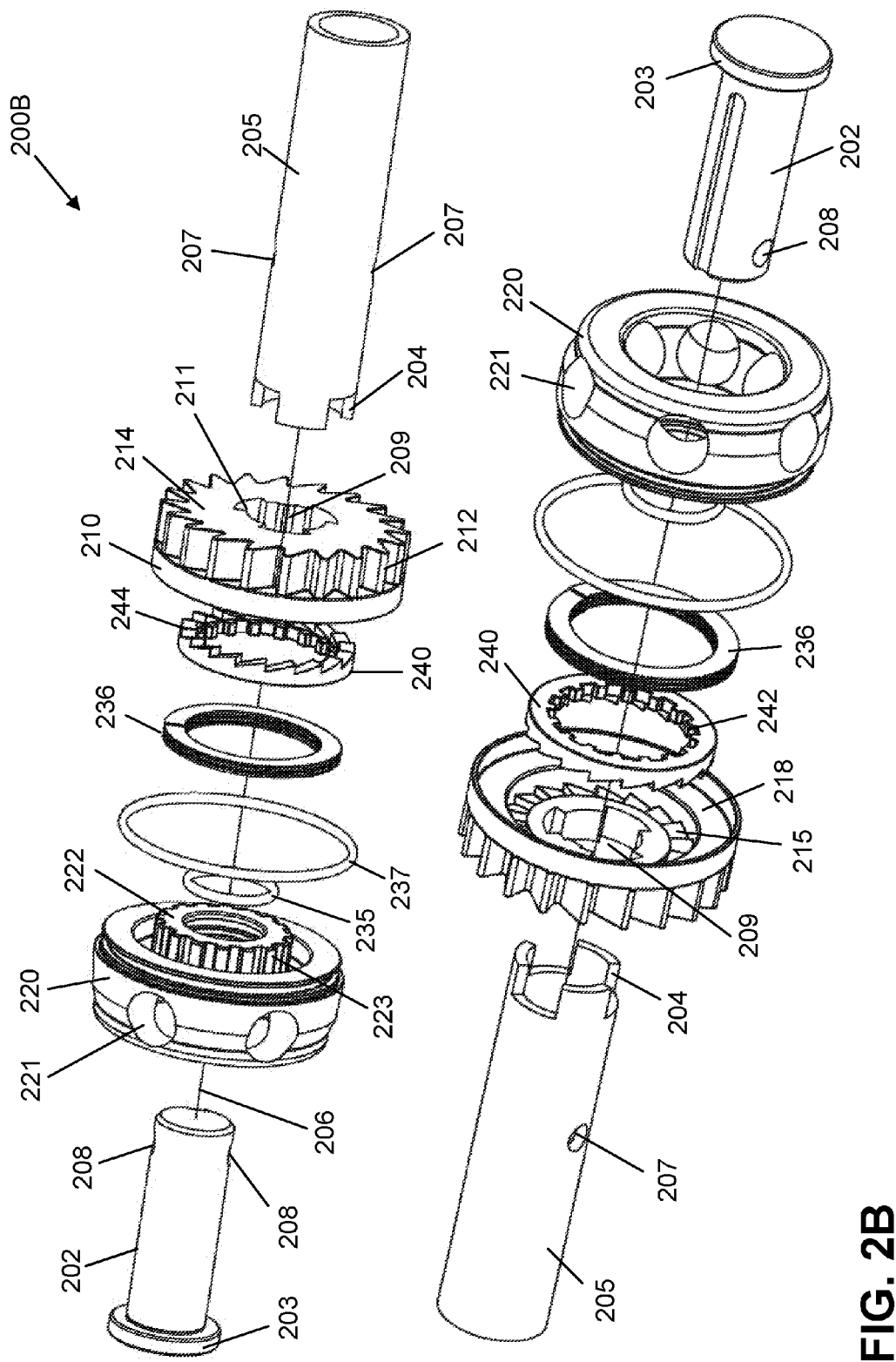
FIG. 2B illustrates an exploded perspective view of another embodiment of a ratcheting tie down apparatus.

Turning to FIG. 2B, an exploded perspective view of another exemplary embodiment of a ratcheting tie down apparatus 200B is illustrated. The apparatus 200B can be affixed to a trailer as part of a ratcheting system to secure cargo, cargo containers, vehicles, etc., to the trailer, such as by straps, including a ratcheting system similar to that illustrated in FIG. 1. In the exemplary embodiment, the apparatus 200B includes the same ratchet head 220, compression spring 236, and ring pawl 240 discussed above for the embodiment of FIG. 2A. Thus, as illustrated in FIG. 2B, the ratchet head 220 may include the cross-holes 221 perpendicular to the rotational axis 206, and the spline 222 extending from the inner face 224 (see FIG. 4) of the ratchet head 220 parallel to the rotational axis 206, where the outside periphery of the spline 222 includes a plurality of spline teeth 223.

Similarly, as illustrated in FIG. 2B, the ring pawl 240 may be generally configured as a ring with an inner circumference large enough to receive the spline 222 of the ratchet head 220. The inner circumference of the ring pawl 240 includes the pawl teeth 242 that correspond to the spline teeth 223 of the ratchet head 220 (see also FIGS. 5A-5C), with the pawl teeth 242 configured to engage the spline teeth 223 of the ratchet head 220 such that the ring pawl 240 may float or move along the spline 222 in a direction parallel to the longitudinal axis 206. The ring pawl 240 also includes the ramped protrusions 244 extending from the front surface of the ring pawl 240 (see also FIGS. 5A-5C) that are arranged in a ring or circle which extends away from the front surface of the ring pawl 240.

The embodiment of the apparatus 200B also has a ratchet gear 210 with most of the same features discussed above. For example, the ratchet gear 210 of apparatus 200B is generally circular in shape and includes the engagement teeth 212 arranged in a ring or circle on an outer periphery of a front surface 214 of the ratchet gear 210 that are configured to engage with a pawl mechanism. The ratchet gear 210 also includes the ramped indentations 215 in the back surface 218 of the ratchet gear 210 (see also FIG. 3). Similarly, the ramped indentations 215 may be cut or milled into the back surface 218 such that the uppermost portions of the ramped indentations 215 are below the plane formed by the back surface 218. However, rather than being arranged around the gear hub 219 as shown in FIG. 2A, in the embodiment of FIG. 2B, the ramped indentations 215 are positioned in a ring or circle around a gear bore 209 that extends through the ratchet gear 210.

As illustrated in FIG. 2B, the front surface 214 of the ratchet gear 210 is configured to be removably attached or affixed to the axle shaft 205. The axle shaft 205 may be made or fabricated from metal, and may be shaft 140 for a system 100 illustrated in FIG. 1. For example, the axle shaft 205 can be any shaft implemented to tie down any load on or to the trailer, such as a cargo container, an automobile, etc. The axle shaft 205 may be further equipped with a chain attachment mechanism, a strap attachment mechanism, or any other appropriate attachment mechanism as described herein to secure the load. In the embodiment of FIG. 2B, the ratchet gear 210 is designed to be removably fixed to the axle shaft 205 such that the ratcheting mechanism (ratchet gear 201, ratchet head 220, compression spring 236, ring pawl 244, etc.) may be easily removed from, and replaced to, the axle shaft 205 for maintenance.

As illustrated in FIG. 2B, the gear bore 209 is configured with a set of bore notches 211 that also extend through the ratchet gear 210 parallel to the gear bore 209. The bore notches are configured to receive a corresponding set of projections 204 that extend from an end of the axle shaft 205. When the projections 204 on the end of the axle shaft 205 are inserted into bore notches 211 of the ratchet gear 210, the axle shaft 205 is affixed to the ratchet gear 210 such that the ratchet gear 210 rotates with the axle shaft 205 as a single unit about the longitudinal/rotational axis 206. Additionally, the gear bore 209 is aligned with the opening in the end of the axle shaft 205 in order to receive the ratchet hub 202 illustrated in FIG. 2B.

The ratchet hub 202 serves to both hold the ratcheting mechanism (ratchet gear 201, ratchet head 220, compression spring 236, ring pawl 244, etc.) together, and to affix these components to the axle shaft 205 (via the bore notches 211 of the in the ratchet gear 210 discussed above) in the embodiment of FIG. 2B. The ratchet hub 202 may be generally cylindrical as illustrated in FIG. 2B and is sized so that a first end of the ratchet hub 202 may be inserted into and through the inner bore 226 of the ratchet head 220 (see also FIG. 4), through the compression spring 236, through the ring pawl 244, through the gear bore 209 of the ratchet gear 210 and into the opening in the end of the axle shaft 205. The first end of the ratchet hub 202 may be inserted into the opening in the end of the axle shaft 205 until holes 207 in opposite sides of the circumference of the axle shaft 205 line up with corresponding engagement holes 208 in opposite sides of the circumference of the ratchet hub 202. A pin or rod may be inserted through the two corresponding sets of holes 207/engagement holes 208 to secure the ratchet hub 202 to the axle shaft 205. When the ratchet hub 202 is inserted into and secured to the axle shaft 205, an end cap 203 on the opposite end of the ratchet hub 202 engages a back surface of the ratchet head 220 to hold the ratcheting mechanism (ratchet gear 201, ratchet head 220, compression spring 236, ring pawl 244, etc.) together and in place against the axle shaft 205. The ratchet hub 202 of apparatus 200B allows for the ratcheting mechanism (ratchet gear 201, ratchet head 220, compression spring 236, ring pawl 244, etc.) in this embodiment to be removed from the axle shaft 205, while leaving the axle shaft 205 in place on the trailer, providing for even easier maintenance and service of the apparatus 200B.

Once the ratchet gear 210 and the ratchet head 220 are assembled together into the apparatus 200B of FIG. 2B, the back side of the compression spring 236 engages the inner face 224 of the ratchet head 220. The front side of the compression spring 236 engages the back side of the ring pawl 240. The compression in the compression spring 236 causes the ramped protrusions 244 of the ring pawl 240 to engage the ramped indentations 215 in the back surface 218 of the ratchet gear 210.

When the compression spring 236 is in a least compressed state, the ramped protrusions 244 of the ring pawl 240 are fully engaged with the ramped indentations 215 in the back surface 218 of the ratchet gear 210. In this state, when a torque is applied to the axle shaft 205, each of the vertical portions 247 of the ramped protrusions 244 of the ring pawl 240 press laterally against one of the respective vertical portions 217 of the ramped indentations 215 of the ratchet gear 210. The engagement of the ramped protrusions 244 of the ring pawl 240 with the ratchet gear 210 in this state, cause ratchet gear 210 and the ratchet head 220 to move in this first/forward direction as a unit (i.e. without relative motion of the assembled ratchet gear 210 to the ratchet head 220).

Those skilled in the art will recognize that variations on the embodiments described in FIGS. 2A-2B are possible. For example, in yet another embodiment (not illustrated), the ratchet head 220—instead of the ratchet gear 210—could be configured with the ramped indentations 215. For such alternative embodiments, the spline 222 could be a portion of the ratchet gear 210 instead of the ratchet head 220 as illustrated in FIGS. 2A-2B. Additionally, for such alternate embodiments, the ring pawl 240 would face the opposite direction such that the ramped protrusions 244 of the ring pawl 240 were facing the ramped indentations 215 of the ratchet head 220. Similarly, in such alternate embodiments, the compression spring 236 would be located between the ring pawl 240 and the ratchet gear 210. Such alternate embodiments and variations on the embodiments described in FIGS. 2A-2B are understood to be within the scope of this disclosure.

Returning to the operation of the embodiments of FIGS. 2A-2B, as well as of the alternative embodiments, a respective pawl mechanism (see pawl mechanism 150 in FIG. 1) engages the engagement teeth 212 of the ratchet gear 210 during the first/forward direction of rotation where the ratchet gear 210 and ratchet head 220 rotate together as a single unit. If the rotation does not take up sufficient slack in the chain or strap, then the tie down bar remains in the same cross-hole 221 and the operator simply rotates the opposite rotational direction to the direction implemented to apply the torque as described. This second/reverse rotational direction results in relative rotational movement, or "freewheeling" of the assembled ratchet gear 210 and ratchet head 220.

During the second direction/freewheeling movement, the ramp surfaces 246 of the ring pawl 240 ride along the corresponding ramp surfaces 216 of the ramped indentations 215 of the ratchet gear 210, disengaging the vertical portions 247 of the ring pawl 240 from the vertical portions 217 of the ramped indentations 215 of the ratchet gear 210. For example, a vertical portion 247a of ring pawl 240 (see FIG. 5) may disengage from a first vertical portion 217a of the ramped indentations 215 of the ratchet gear 210 (see FIG. 3). This riding of ramp surface 246 of the ring pawl 240 along ramp surface 216 of the ratchet gear 210 causes the ring pawl 240 to move parallel to the longitudinal axis 206 along the spline teeth 223 of the ratchet head 220 in a direction towards the ratchet head 220 (and away from the ratchet gear 210), compressing the compression spring 236. In this freewheeling movement, the ring pawl 240 moves with the ratchet head 220, and independently of the ratchet gear 210.

Continued opposite rotation (in the second/reverse direction) then causes the ramp surface 246 of the ring pawl 240 to slide off the highest point on the ramp surface 216 of a first ramped indentation of the ratchet gear 210, and onto the lowest point on the ramp surface 216 of the next or second ramped indentation of the ratchet gear 210. At this point, the compression spring 236 decompresses, causing the ring pawl 240 to move parallel to the longitudinal axis 206 along the spline teeth 223 of the ratchet head 220 in a direction away from the ratchet head 220 (and towards the ratchet gear 210). This longitudinal movement of the ring pawl 240 causes the vertical portion 247a of the ramped protrusion 244 of the ring pawl 240 (see FIG. 5A-5C) to engage a second or subsequent vertical portion 217b of the ramped indentations 215 of the ratcheting gear 210 (see FIG. 3). It is appreciated that the movement of the ramp surface 246 of the ring pawl 240 may "ride through" several ramped indentations of the ratchet gear 210 as described above in a ratcheting manner. The compression of the compression spring 236 and the subsequent movement of the ring pawl 240 associated with the compression is in a direction parallel to the longitudinal axis 206. When the operator is ready to rotate the assembled ratchet gear 210 and ratchet head 220 in the first/forward direction again to further tighten the chain and/or strap, the operator simply reapplies the force as described herein resulting in the rotation of the assembled ratchet gear 210 and ratchet head 220 with no relative motion between them as described above. This process can be repeated as necessary.

It is thus appreciated that rotation of the ratchet gear 210 and the ratchet head 220 in the second or reverse direction forces the spring loaded ring pawl 240 to "ramp out" and then reengage subsequent ramped indentations 215 of the ratchet gear 210. This configuration, along with the engagement of the pawl teeth 242 of the ring pawl 240 with the spline teeth 223 of the ratchet head, results in a "freewheeling" condition between the ratchet gear 210 and the ratchet head 220/ring pawl 240. Rotation of the ratchet gear 405 and the ratchet head 420 in the opposite or the first/forward direction forces the ramped protrusions 244 of the spring-loaded ring pawl 240 to engage with the corresponding ramped indentations 215 of the ratchet gear 210 resulting in a lock up condition between the ratchet gear 210 and the ratchet head 220 as described above.

It will also be appreciated that the inclusion of a greater number of ramped protrusions 244 on the ring pawl 240 (and corresponding ramped indentations 215 on the ratchet gear 210) provide smaller/more precise adjustments of the ratchet gear 210 than are possible with prior art systems. This allows for more/finer degree of engagement teeth 212 to be used on the ratchet gear 210, providing correspondingly smaller/more precise adjustments of the tension in a strap or chain attached to the axle shaft 205 than are possible in prior art systems. At the same time, the relatively few number of moving parts, i.e. ratchet gear 210, ratchet head 220 and ring pawl 240, allow for easier and less costly manufacture, as well as easier and less costly maintenance and service of the apparatuses 200A and/or 200B once in use on a transport trailer than is possible with prior art systems.

Figure 6A:
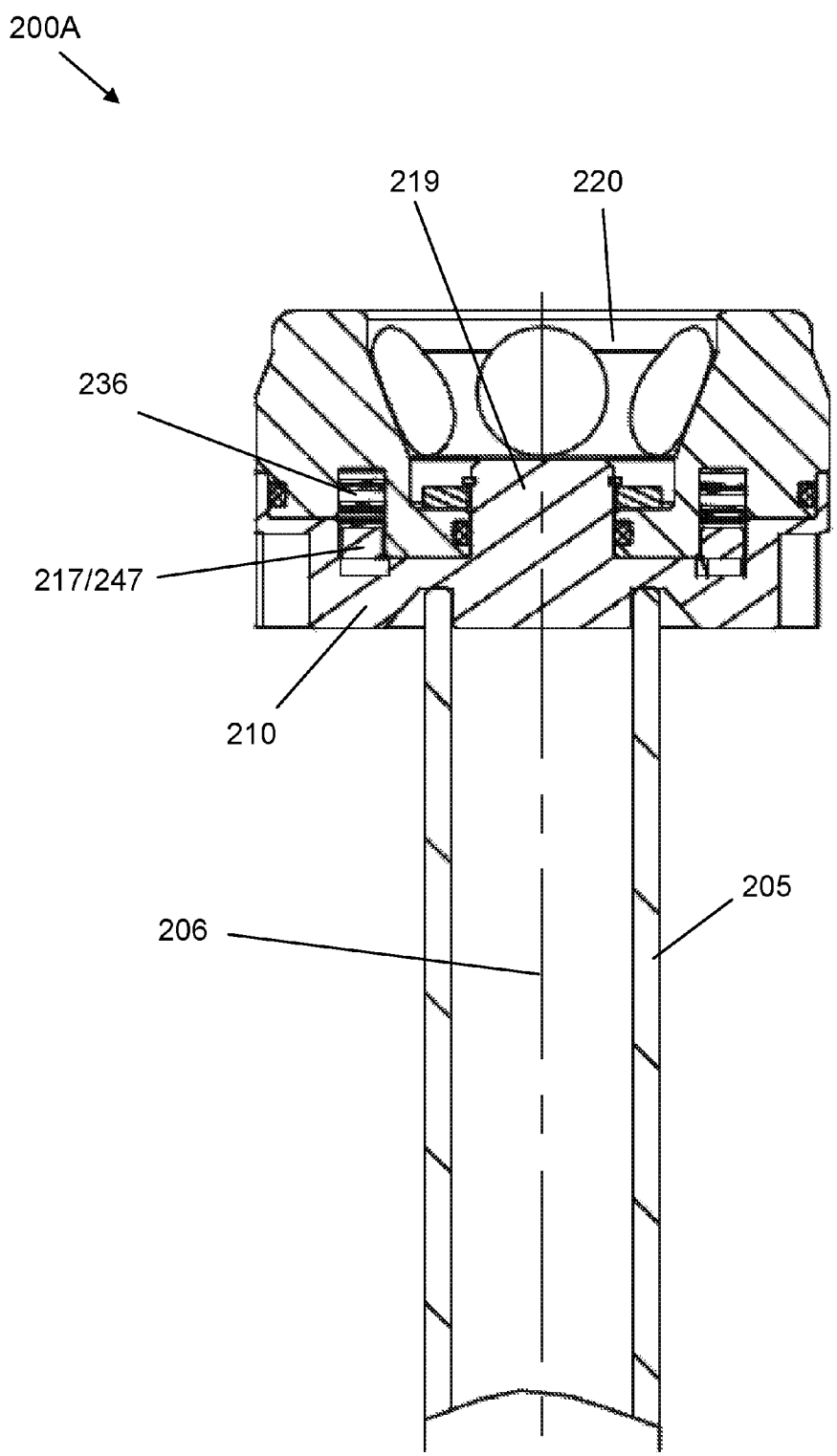
FIG. 6A illustrates a cross sectional side view of an exemplary assembled ratcheting tie down apparatus of the embodiment of FIG. 2A when the apparatus is rotated in a first direction.
Figure 6B:
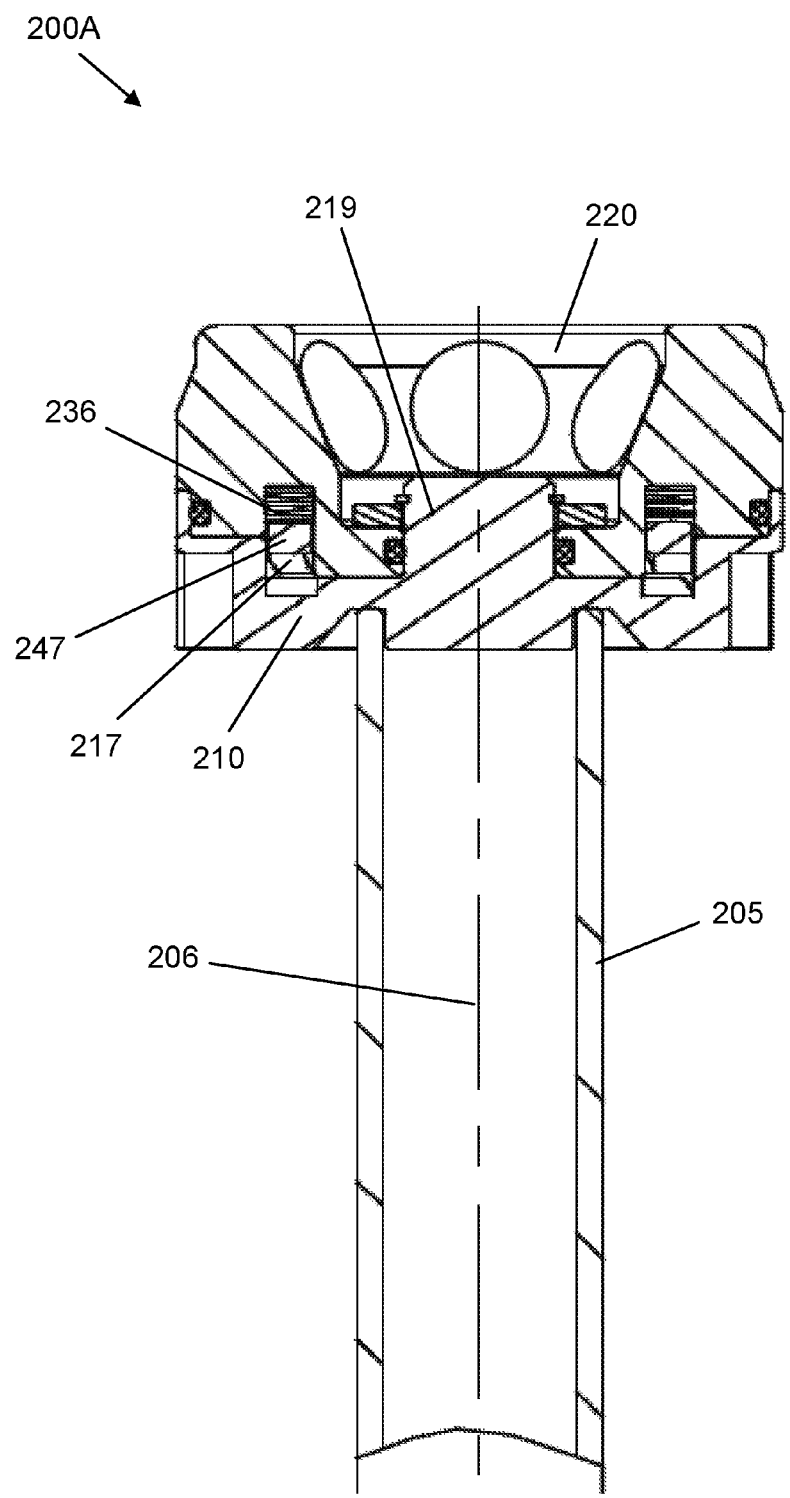
FIG. 6B illustrates a cross sectional side view of the exemplary assembled ratcheting tie down apparatus of FIG. 6A when the apparatus is rotated in a second direction.

FIGS. 6A-6B illustrates an exemplary cross sectional side view of an exemplary assembled ratcheting tie down apparatus 200A of the embodiment of FIG. 2A. FIG. 6A illustrates when the apparatus 200A is rotated in the first/forward direction such that the ratchet gear 210 and ratchet head 220 are "engaged" and rotate as a unit. FIG. 6B illustrates when the apparatus 200A is rotated in the second/reverse direction and ratchet gear 210 moves relative to the ratchet head 220 with the freewheeling motion described above.

As illustrated in FIG. 6A, and discussed above, when the ratchet head 220 is rotated in the first/forward direction around the longitudinal/rotational axis 206, the ratchet gear 210 and ratchet head 220 are engaged. In particular, the compression spring 236 is in a least compressed state, and each of the vertical portions 247 of the ramped protrusions 244 of the ring pawl 240 press laterally against one of the respective vertical portions 217 of the ramped indentations 215 of the ratchet gear 210. The engagement of the ramped protrusions 244 of the ring pawl 240 with the vertical portions 217 of the ratchet gear 210 in this state, and the engagement of the pawl teeth 242 or the ring pawl 240 with the spline teeth of the ratchet head 220 (not illustrated in FIG. 6A), cause ratchet gear 210 and the ratchet head 220 to move in this first/forward direction as a unit (i.e. without relative motion of the assembled ratchet gear 210 to the ratchet head 220).

As illustrated in FIG. 6B, and discussed above, when the ratchet head 220 is rotated in the second/reverse direction around the longitudinal/rotational axis 206, the ratchet gear 210 and ratchet head 220 move relative to each other with the freewheeling motion. In particular, the compression spring 236 is at least partially compressed state, and the ramp surfaces of the 246 of the ring pawl 240 ride along the corresponding ramp surfaces 216 of the ramped indentations 215 of the ratchet gear 210 as discussed above, disengaging the vertical portions 247 of the ring pawl 240 from the vertical portions 217 of the ramped indentations 215 of the ratchet gear 210 as shown in FIG. 6B. The disengagement of the vertical portions 247 of the ring pawl 240 from the vertical portions 217 of the ratchet gear 210 in this state cause ratchet gear 210 and the ratchet head 220 to freewheel and/or move in relation to each other when the ratchet head 220 is rotated in the second/reverse direction.

Figure 7A:
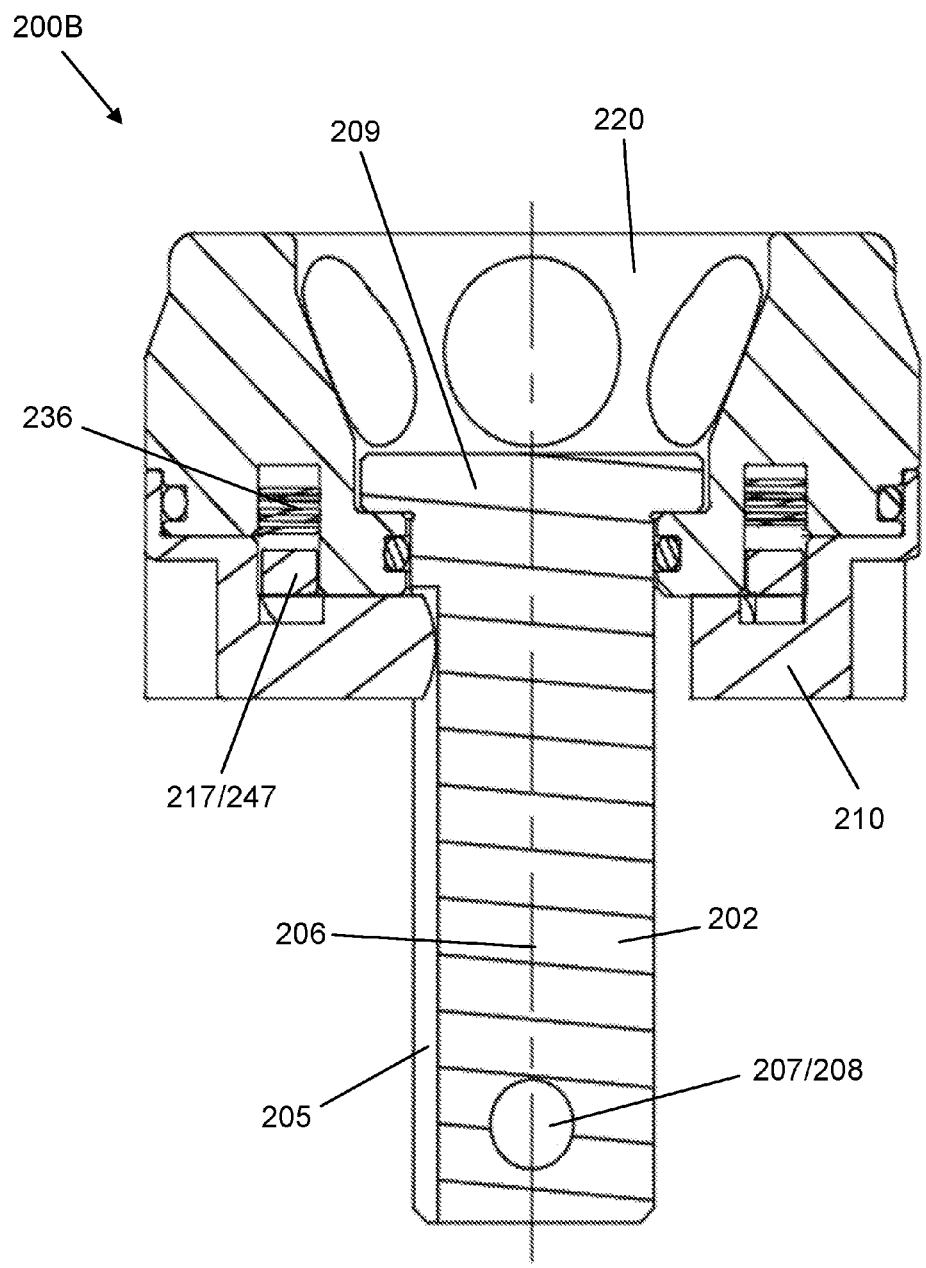
FIG. 7A illustrates a cross sectional side view of an exemplary assembled ratcheting tie down apparatus of the embodiment of FIG. 2B when the apparatus is rotated in a first direction.
Figure 7B:
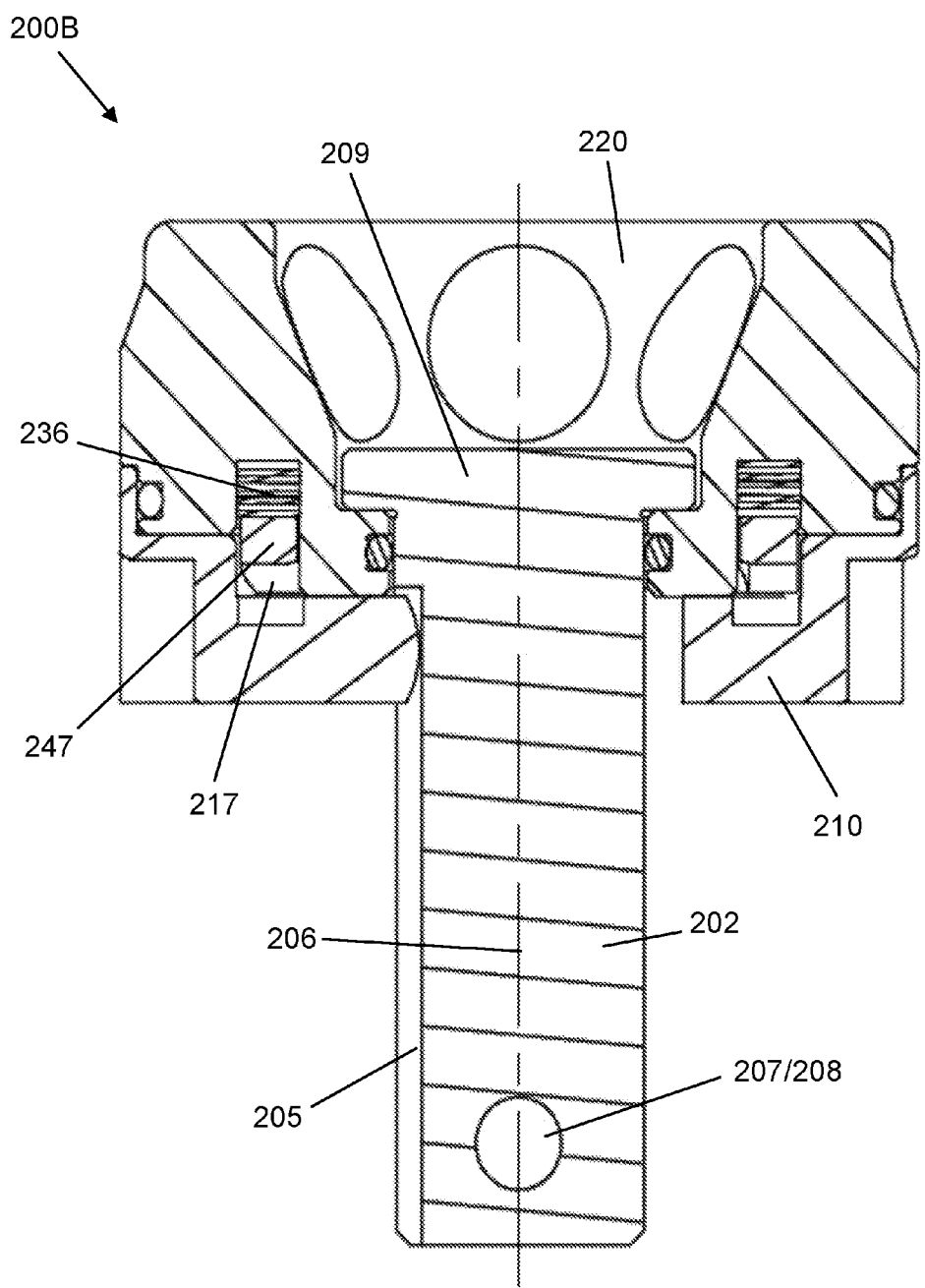
FIG. 7B illustrates a cross sectional side view of the exemplary assembled ratcheting tie down apparatus of FIG. 7A when the apparatus is rotated in a second direction.

FIGS. 7A-7B illustrates an exemplary cross sectional side view of an assembled ratcheting tie down apparatus 200B of the embodiment of FIG. 2B. As illustrated in FIGS. 7A-7B, and discussed above, the ratchet hub 202 is inserted into the axle shaft 205 such that the holes 207 of the axle shaft 205 align with the engagement holes 208 of the ratchet hub 202. A pin may be inserted (not shown in FIGS. 7A-7B) through the sets of holes 107/108 to hold the ratchet hub 202 in place with the axle shaft 205. FIG. 7A illustrates when the apparatus 200B is rotated in the first/forward direction such that the ratchet gear 210 and ratchet head 220 are "engaged" and rotate as a unit. FIG. 7B illustrates when the apparatus 200B is rotated in the second/reverse direction and ratchet gear 210 moves relative to the ratchet head 220 with the freewheeling motion described above.

As illustrated in FIG. 7A, when the ratchet head 220 is rotated in the first/forward direction around the longitudinal/rotational axis 206, the ratchet gear 210 and ratchet head 220 are engaged. In particular, the compression spring 236 is in a least compressed state, and each of the vertical portions 247 of the ramped protrusions 244 of the ring pawl 240 press laterally against one of the respective vertical portions 217 of the ramped indentations 215 of the ratchet gear 210. The engagement of the ramped protrusions 244 of the ring pawl 240 with the vertical portions 217 of the ratchet gear 210 in this state, and the engagement of the pawl teeth 242 or the ring pawl 240 with the spline teeth of the ratchet head 220 (not illustrated in FIG. 7A), cause ratchet gear 210 and the ratchet head 220 to move in this first/forward direction as a unit (i.e. without relative motion of the assembled ratchet gear 210 to the ratchet head 220).

As illustrated in FIG. 7B, and discussed above, when the ratchet head 220 is rotated in the second/reverse direction around the longitudinal/rotational axis 206, the ratchet gear 210 and ratchet head 220 move relative to each other with the freewheeling motion. In particular, the compression spring 236 is at least partially compressed state, and the ramp surfaces of the 246 of the ring pawl 240 ride along the corresponding ramp surfaces 216 of the ramped indentations 215 of the ratchet gear 210 as discussed above, disengaging the vertical portions 247 of the ring pawl 240 from the vertical portions 217 of the ramped indentations 215 of the ratchet gear 210 as shown in FIG. 7B. The disengagement of the vertical portions 247 of the ring pawl 240 from the vertical portions 217 of the ratchet gear 210 in this state cause ratchet gear 210 and the ratchet head 220 to freewheel and/or move in relation to each other when the ratchet head 220 is rotated in the second/reverse direction.

While the invention has been described with reference to exemplary embodiments, it will be understood by those skilled in the art that various changes may be made and equivalents may be substituted for elements thereof without departing from the scope of the invention, including the alternate embodiments discussed above. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc., do not denote a limitation of quantity, but rather denote the presence of at least one of the referenced item. Similarly, use of the terms set, plurality, etc., also do not denote a limitation of quantity, but rather denote the presence of at least two of the reference item.

What is claimed is:

1. A ratcheting tie down system for a transport trailer, the system comprising:
   a ratchet assembly affixed to an end of a tie down shaft having a longitudinal axis, the tie down shaft being affixed to the transport trailer; and
   a pawl mechanism coupled to the ratchet assembly,
   wherein the ratchet assembly comprises:
      a ratchet gear, the ratchet gear having engagement teeth on an outer circumference of the ratchet gear configured to receive the pawl mechanism and a plurality of ramped indentations formed in a back surface of the ratchet gear,
      a ratchet head with a front surface positioned in opposition to and in mechanical contact with the back surface of the ratchet gear, the ratchet head have a spline extending from an inner face,
      a ring pawl disposed between the ratchet gear and the ratchet head, the ring pawl having an inner circumference configured to engage the spline of the ratchet head, the ring pawl further having a plurality of ramped protrusions extending from a front surface of the ring pawl and in contact with the ramped indentations of the ratchet gear, and
      a compression spring disposed between the ratchet head and the ring pawl, the compression spring configured to cause ramped protrusions of the ring pawl to engage the ramped indentations of the ratchet gear,
      wherein the ring pawl is configured to engage the ratchet gear when the ratchet head is rotated in a first direction such that the ratchet head and ratchet gear rotate as a single unit, and the ring pawl is configured to disengage from the ratchet gear when the ratchet head is rotated in a second direction such that the ratchet head and ratchet gear rotate independently.

2. The system of claim 1, wherein the ramped protrusions of the ring pawl are configured to engage the ramped indentations of the ratchet gear when the ratchet head is rotated in the first direction, and the ramped protrusions of the ring pawl are configured to slidably disengage from the ramped indentations of the ratchet gear when the ratchet head is rotated in the second direction.

3. The system of claim 1, wherein the transport trailer comprises a vehicle trailer with a plurality of vehicle platforms and the tie down shaft is affixed to one of the one or more of the vehicle platforms.

4. The system of claim 1, wherein:
   the spline of the ratchet head further includes a plurality of spline teeth in an outer circumference of the spline, and
   the inner circumference of the ring pawl further includes a plurality of pawl teeth configured to engage the spline teeth of the spline such that the ring pawl moves rotationally as a unit with the ratchet hub.

5. The system of claim 4, wherein the engagement of the pawl teeth with the spline teeth further allows the ring pawl to move with respect to the spline in a direction parallel to the longitudinal axis.

6. The system of claim 5, wherein when the ratchet head is rotated in the first direction, the compression spring is placed into an extended position and a plurality of vertical portions of the ramped protrusions of the ring pawl engage a corresponding plurality of vertical portions of the ramped indentations of the ratchet gear.

7. The system of claim 5, wherein when the ratchet head is rotated in the second direction, a plurality of ramp surfaces of the ramped protrusions of the ring pawl slide on a corresponding plurality of ramp surfaces of the ramped indentations of the ratchet gear disengaging the ring pawl from the ratchet gear.

8. The system of claim 7, wherein the sliding of the plurality of ramp surfaces of the ring pawl on the plurality of ramp surfaces of the ratchet gear causes the ring pawl to move parallel to the longitudinal axis of the spline in a direction toward the ratchet head and places the compression spring into a compressed position.

9. The system of claim 5, further comprising an outer seal disposed between the front surface of the ratchet head and the back surface of the ratchet gear.

10. The system of claim 5, wherein:
    the end of a tie down shaft is affixed to a front surface of the ratchet gear,
    the ratchet gear further includes a hub extending outwardly past the back surface of the ratchet gear, and
    the ratchet head further includes an inner bore extending through the center of the ratchet head, the inner bore of the ratchet head sized to receive the hub of the ratchet gear.

11. The system of claim 5, further comprising:
    a ratchet hub with a generally circular first end, wherein
    the ratchet head further includes an inner bore extending through the center of the ratchet head, the inner bore sized to receive the first end of the ratchet hub,
    the ratchet gear further includes a gear bore extending through the center of the ratchet gear, the gear bore sized to receive the first end of the ratchet hub, and
    the end of the tie down shaft includes an opening sized to receive the first end of the ratchet hub.

12. The system of claim 1, wherein the end of the tie down shaft is affixed to a front surface of the ratchet gear.

13. A ratcheting apparatus for use with a transport trailer, the apparatus comprising:
- a ratchet gear, the ratchet gear having engagement teeth on an outer circumference of the ratchet gear configured to receive the pawl mechanism, the ratchet gear having a spline extending from a back surface with a plurality of spline teeth formed on a circumference of the spline,
- a ratchet head with a front surface positioned in opposition to and in mechanical contact with the back surface of the ratchet gear, the ratchet head having a plurality of ramped indentations formed the back surface,
- a ring pawl disposed between the ratchet gear and the ratchet head, the ring pawl having an inner circumference containing a plurality of pawl teeth configured to engage the spline teeth of the ratchet gear, the ring pawl further having a plurality of ramped protrusions extending from a front surface of the ring pawl and in contact with the ramped indentations of the ratchet head, and
- a compression spring disposed between the ratchet gear and the ring pawl, the compression spring configured to cause ramped protrusions of the ring pawl to engage the ramped indentations of the ratchet head,
- wherein the ring pawl is configured to engage the ratchet head such that when the ratchet head is rotated in a first direction, the ratchet head and ratchet gear rotate as a single unit, and the ring pawl is configured to disengage from the ratchet head when the ratchet head is rotated in a second direction such that the ratchet head and ratchet gear rotate independently.

14. The apparatus of claim 13, wherein the ramped protrusions of the ring pawl are configured to engage the ramped indentations of the ratchet head when the ratchet head is rotated in the first direction, and the ramped protrusions of the ring pawl are configured to slidably disengage from the ramped indentations of the ratchet head when the ratchet head is rotated in the second direction.

15. The apparatus of claim 13, further comprising a tie down shaft affixed to the transport trailer such that the tie down shaft rotates around a longitudinal axis, wherein an end of the tie down shaft is affixed to a front face of the ratchet gear.

16. The apparatus of claim 13, wherein the plurality of pawl teeth are configured to engage the spline teeth of the spline such that the ring pawl moves rotationally around the longitudinal axis as a unit with the ratchet gear and the ring pawl moves with respect to the spline of the ratchet gear in a direction parallel to the longitudinal axis.

17. The apparatus of claim 16, wherein when the ratchet head is rotated in the first direction, the compression spring is placed into an extended position and a plurality of vertical portions of the ramped protrusions of the ring pawl engage a corresponding plurality of vertical portions of the ramped indentations of the ratchet head.

18. The apparatus of claim 16, wherein when the ratchet head is rotated in the second direction, a plurality of ramp surfaces of the ramped protrusions of the ring pawl slide on a corresponding plurality of ramp surfaces of the ramped indentations of the ratchet head disengaging the ring pawl from the ratchet head.

19. The apparatus of claim 18, wherein the sliding of the plurality of ramp surfaces of the ring pawl on the plurality of ramp surfaces of the ratchet head causes the ring pawl to move parallel to the longitudinal axis of the spline in a direction toward the ratchet gear and places the compression spring into a compressed position.

20. The system of claim 16, wherein:
- the ratchet gear further includes a hub extending outwardly past the back surface of the ratchet gear, and
- the ratchet head further includes an inner bore extending through the center of the ratchet head, the inner bore of the ratchet head sized to receive the hub of the ratchet gear.

* * * * *